United States Patent [19]

Amthor

[11] Patent Number: 4,959,280

[45] Date of Patent: Sep. 25, 1990

[54] BATTERY ASSEMBLY

[75] Inventor: Helmut K. Amthor, Rocky River, Ohio

[73] Assignee: Eveready Battery Company, Inc., St. Louis, Mo.

[21] Appl. No.: 434,371

[22] Filed: Nov. 13, 1989

[51] Int. Cl.⁵ .................................. H01M 2/06
[52] U.S. Cl. ............................. 429/27; 429/99
[58] Field of Search .............. 429/99, 27, 152, 153, 429/154, 159, 158

[56] References Cited

U.S. PATENT DOCUMENTS

| | | | |
|---|---|---|---|
| 777,457 | 12/1904 | Wappler et al. | 429/99 |
| 1,075,556 | 10/1913 | Fenoughty | 429/99 |
| 1,568,927 | 1/1926 | Stone et al. | 429/99 |
| 4,547,438 | 10/1985 | McArthur et al. | 429/82 |
| 4,620,111 | 10/1986 | McArthur et al. | 429/27 |

FOREIGN PATENT DOCUMENTS 0495851  9/1953  Canada .............................. 429/159

OTHER PUBLICATIONS

Four Photographs and a drawing of a battery containing metal air cells.

*Primary Examiner*—Donald L. Walton
*Attorney, Agent, or Firm*—Virgil B. Hill

[57] ABSTRACT

The invention relates to a battery comprising a rectangular housing containing two series connected cylindrical cell stacks disposed within the housing in parallel relationship and arranged such that the longitudinal axis of each cell stack is parallel to the width dimension of the housing and wherein the cells of the two cell stacks are connected in series to terminals on the exterior of the housing.

14 Claims, 2 Drawing Sheets

4,959,280

BATTERY ASSEMBLY

FIELD OF THE INVENTION

This invention relates to a new and improved multiple cell battery and in particular to a container assembly for cylindrical cells, such as small size air depolarized button cells.

BACKGROUND OF THE INVENTION

Standard galvanic cells usually produce an open circuit voltage of about 1.5 volts. When a higher voltage is required, it is customary to combine a multiplicity of these cells to form a battery having a required voltage. The cells are usually disposed in a container and connected in series with external terminals attached to the container and making contact with the cells. Therefore a 9-volt battery, commonly used in portable devices, would contain six 1.5 volt cells connected in series.

The individual cells within the multiple cell battery conventionally may be connected electrically by soldering or welding leads to the appropriate cell terminals. Soldering or welding the connections is a costly step, however, in assembling the battery. If the soldering or welding is done manually, then consistent quality connections may be hard to achieve. Also, if the batteries are subjected to severe shock and/or vibration, either in shipment or in usage, the soldered joints may be damaged or sometimes completely destroyed.

Another more recent type of multiple cell battery has eliminated the necessity for soldered or welded connections to electrically connect the cells. The battery utilizes pressure contact conductive strips to achieve proper intercell electrical connection. These strips are usually held in place by spring means which provide the necessary pressure to insure proper electrical contact between the individual cells and the strips.

Another problem with conventional multiple cell batteries is the possible leakage of corrosive exudate from the individual cells. In a confined container, any exudate could be contained in the container and prevent any environmental problem if the exudate poses a hazard. For example, electrolyte in various cells could escape to the environment under extreme operating conditions, such as when the cells are overly discharged.

U.S. Pat. No. 4,547,438 describes a battery assembly which comprises several gas depolarizable electrochemical cells, e.g., metal/air cells, stacked electrically in series along a first dimension. Each cell has first and second electrodes of opposite polarities. The battery assembly also comprises a housing for containing the stack of cells. The housing includes a structure for ventilating the interior of the housing and further includes first and second opposite end walls which lie perpendicular to the first dimension. The stack of cells is arranged within the housing with the first electrode of the initial cell of the stack facing the first wall and the second electrode of the final cell of the stack facing the second wall. The battery assembly further includes first and second electrically conductive connectors disposed within the housing. The first connector has a first end electrically coupled to the first electrode of the initial cell and a second end disposed adjacent the first wall. The second connector has a first end electrically coupled to the second electrode of the final cell and a second end also disposed adjacent the first wall. The battery assembly further comprises first and second terminals which are electrically coupled to the first and second connectors, respectively, and extend through the first wall to the exterior of the housing.

It is an object of the present invention to provide a multiple cell battery that is easy to assemble and that makes maximum use of the internal volume of the battery housing to accommodate cylindrical cells.

It is another object of the present invention to provide a multiple cell battery that uses pressure contact means for connecting a plurality of cells in series and to the outside terminals on the cells' housing.

It is another object of the present invention to provide a multiple cell battery that is suitable for connecting in series a plurality of depolarized cells.

It is another object of the present invention to provide a multiple cell battery that is easy to assembly and cost effective to produce.

Further objects, aspects and advantages of the invention will become apparent from the following detailed description and accompanying drawings.

SUMMARY OF THE INVENTION

The invention relates to a battery comprising a plurality of cylindrical cells assembled in a rectangular housing comprising a base, upstanding walls and a cover and having a length dimension, a width dimension and a depth dimension; an external first terminal spaced apart from an external second terminal on said housing; a first plurality of cylindrical cells connected in series and assembled in said housing such that the longitudinal axis of the cells is parallel to the width dimension of the housing, said first plurality of cells having a positive terminal at one end and a negative terminal at the opposite end; a second plurality of cylindrical cells connected in series and assembled in said housing such that the longitudinal axis of the cells is parallel to the width dimension of the housing and parallel to and in the plane of the longitudinal axis of the first plurality of cells, said second plurality of cells having a positive terminal at one end and a negative terminal at the opposite end; a first conductive strip electronically connected to the first terminal on said housing at one end and to the positive terminal of said first plurality of cells at the opposite end; a second conductive strip electronically connected to the second terminal on said housing at one end and to the negative terminal of said second plurality of cells at the opposite end; a third conductive strip electronically connected to the negative terminal of said first plurality of cells at one end and to the positive terminal of said second plurality of cells at the opposite end so that all the cells within said housing are connected in series to the external terminals on said housing.

Preferably, the cylindrical cells are button cells and the depth dimension of the rectangular housing is only slightly larger than the diameter of the cells. The assembly of the cells in two parallel stacks with the diameter of the cells slightly less than the depth dimension of the housing, provides for maximum utilization of the internal space or volume of the housing. Utilizing this novel design arrangement for the cells permits the use of only three conductive strips to be used as pressure contact means for connecting the cells in series to the external terminals on the housing. Thus a battery can be assembled with a minimum of parts to produce series connected cells comprised of at least two stacks of cylindrical cells disposed Parallel to each other and arranged so that the diameter of the cylindrical cells is only slightly less than the depth dimension of a rectangular housing in which the cells are assembled. The use of pressure contact conductive strips eliminates the need for soldering or welding and other expensive and time consuming assembly steps that were formerly required.

Although the battery assembly of this invention is suitable for all types of cylindrical cells, small button cells are preferable. Any cell system can be used although the battery housing is ideally suited for metal/air cells that utilize zinc and air which are relatively benign to the environment. These cells are substantially lighter than mercury cells and have good shelf life. When using metal/zinc cells, the battery housing has to have at least one aperture to permit air to enter the interior of the housing so that it will be available for use by the cells. In addition, grooves or notches could be disposed on the exterior of at least one of the surfaces of the housing and at least one aperture could be placed in the groove or notch. Thus when the battery is placed on a surface, the groove or notch will provide a passage for the air to reach the aperture and thereby permit air to enter the interior of the housing. Air depolarized cells utilize oxygen gas as the cathode material and have the advantage of high ampere hour capacity with low cost production.

DESCRIPTION OF THE PRIMARY EMBODIMENT

Figure 1:
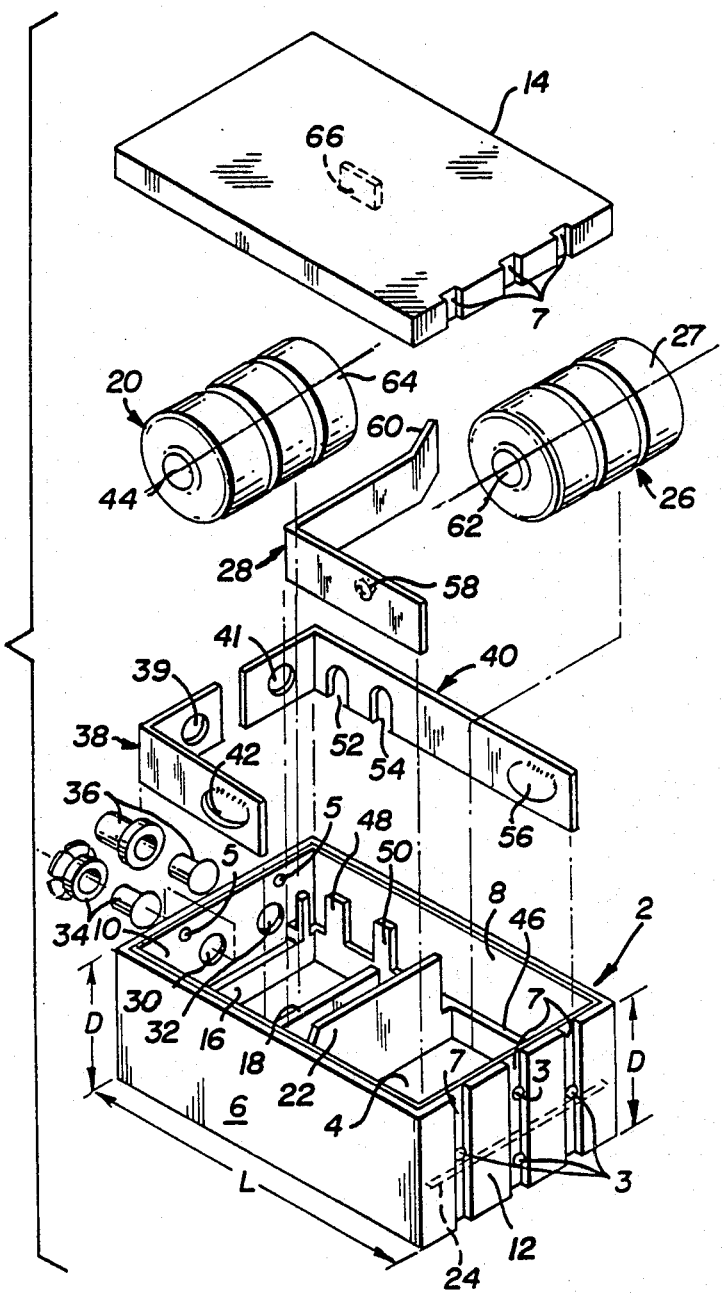
FIG. 1 is an exploded view of a battery of this invention showing two sets of three cylindrical cells positioned to be assembled parallel to each other in a rectangular housing.

FIG. 1 shows a rectangular housing 2 comprising a base 4, upstanding walls 6, 8, 10, 12 adapted to be closed by a cover 14. A pair of ribs 16 and 18 are disposed at the bottom of base 4 and spaced apart sufficient to accommodate a stack of three series connected cylindrical cells 20. A second pair of spaced apart ribs 22 and 24 (shown in broken lines) accommodate a second stack of three series connected cylindrical cells 26. Ribs 18 and 22 will assure that the cell stack 20 will not contact cell stack 26 since the containers of the cells are usually the positive terminals for the cell system. Ribs 18 and 22 extend higher than ribs 16 and 24 and are spaced apart sufficiently to accommodate conductive strip 28 so that conductive strip will contact only one cell in stack 20 as will be described below.

Figure 2:
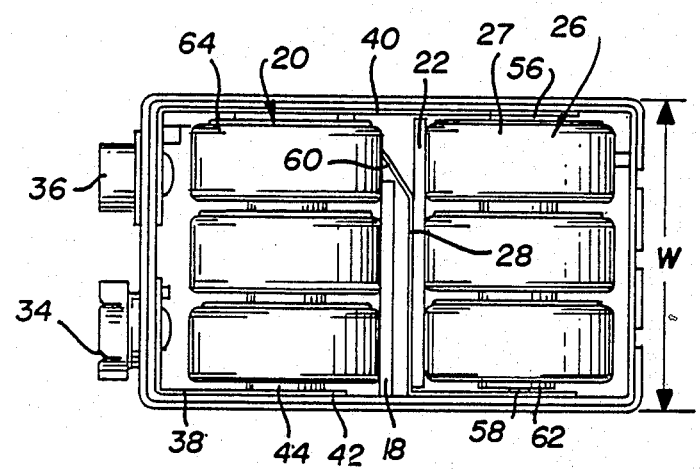
FIG. 2 is a plan view of the battery of FIG. 1 showing the cells assembled in the housing of the battery.

With reference to FIG. 2, the cell stacks 20 and 26 are assembled in the rectangular housing 2 such that the longitudinal axis of each cell stack 20, 26 is parallel to the width dimension W of housing 2. The length dimension L and the depth dimension D of housing 2 is shown in FIG. 1. Wall 10 of housing 2 has two openings 30 and 32 to accommodate socket-rivet 34 and stud-rivet 36, respectively. The stud-rivet 36 and socket-rivet 34 are adapted as the terminals of the battery. Prior to assembling socket-rivet 34 and stud-rivet 36 onto wall 10 of housing 2, "L" shaped conductive strip 38 and "L" shaped conductive strip 40 are positioned in the housing 2 so that rivet 34 passes through opening 39 of strip 38 and rivet 36 passes through opening 41 of strip 40 thereby securing strips 38 and 40 to the interior of the housing 2. Cell stack 20 and cell stack 26 are then assembled into housing 2 such that they are arranged parallel to each other and their longitudinal axis is parallel to the width dimension W. Conductive strip 38 has a spring portion 42 which pressure contacts the center negative terminal 44 of cell stack 20. Disposed in housing 2 along the interior of wall 8 is a rib 46 which has two spaced apart upright ribs 48, 50. Conductive strip 40 has two spaced apart slots 52, 54 which accommodate ribs 48, 50 respectively. Thus when conductive strip 40 is assembled in the housing 2 it rests upon rib 46 and the projected ribs 48, 50 assures that the positive terminal bottom 64 of cell stack 20 does not make contact with conductive strip 40. The end of conductive strip 40 has a projected dimple 56 that makes contact with the positive terminal bottom 27 of cell stack 26 while being electrically isolated from the bottom of cell stack 20. Conductive strip 28 is "L" shaped having a projected dimple 58 at its horizontal segment and a tapered segment 60 at its vertical segment. As stated above, conductive strip 28 is placed between ribs 18 and 22 so that its projected dimple 58 makes pressure contact with the central negative terminal 62 of cell stack 26 as shown in FIG. 2. The tapered segment 60 extends to contact the container 64 of cell stack 20 thereby electronically connecting the central negative terminal 62 of cell stack 26 to the end container 64 of cell stack 20 which places the cells in series connection.

Once the cell stacks 20, 26 and conductive strips 28, 38, 40 are assembled in housing 2, the cover 14 is placed over the housing and secured by conventional means. The cover 14 has a centrally located tab 66 which faces ribs 18 and 22 in housing 2 and provides a securing means to secure strip 28 between ribs 18 and 22. As can be seen from FIG. 2, terminal 34 is electronically connected to terminal 44 of cell stack 20 via conductive strip 38, the opposite terminal 64 of cell stack 20 is electronically connected to terminal 62 of cell stack 26 via conductive strip 28, and terminal 27 of cell stack 26 is electronically connected to terminal 36 via conductive strip 40. This arrangement places all the cells in series connection across the terminals 34 and 36 on housing 2. The base 4 and cover 14 could have arcuate depressions in the interior surface to accommodate the cell stacks 20, 26 so that the D dimension would be larger than the diameter of the cells by less than the thickness of base 4 and cover 14 materials.

As is evident from FIGS. 1 and 2, the depth dimension D is only slightly larger than the diameter of cell stacks 20, 26 (generally no larger than the thickness of the cover and base of the housing) and thereby maximum utilization of the volume of the housing is made for the cells. The three conductive strips 28, 38, 40 are all that is required to provide pressure contact to the cell stacks to provide a series connection of cells within the battery housing. Although the conductive strips provide pressure contact for the cells, if desired one or more of the conductive strips could be soldered, or welded to the cells using other conventional means.

When using air depolarized cells, the housing has to contain one or more apertures so that in FIG. 1, wall 12 is shown with four apertures 3 and wall 10 is shown with two apertures 5 to permit adequate air to enter the interior of housing 2 and be available for use by the air depolarized cells. In wall 12 and cover 14, grooves 7 are shown which will permit air to enter the apertures 3 in wall 12 when the battery is positioned so that wall 12 rests on a surface. Specifically, when the battery is positioned such that wall 12 rests on a surface, air can enter the grooves 7 and pass through apertures 3 in said grooves 7 into the interior of the cell. In a similar manner, the projection of terminals 34, 36 will prevent apertures 5 from being blocked so that air will also be available to enter the interior of the battery through apertures 5. The housing could be made of any conventional plastic, such as polystyrene or other type material suitable for containing the cells. In the embodiment shown only six cells are assembled in the housing. If desired, any number of cells could be assembled in the housing using the design arrangement of this invention.

While a particular embodiment of the invention has been described above, the invention is not limited to that embodiment. Alternative embodiments and modifications which would still be encompassed by the invention may be made by those skilled in the art, particularly in light of the foregoing teachings. Therefore, the following claims are intended to cover any alternative embodiments, modifications or equivalents which may be included within the spirit and scope of the invention as claimed.

What is claimed:

1. A battery comprising a plurality of cylindrical cells assembled in a rectangular housing comprising a base, upstanding walls and a cover, and having a length dimension, a width dimension and a depth dimension; an external first terminal spaced apart from an external second terminal on said housing; a first plurality of cylindrical cells connected in series and assembled in said housing such that the longitudinal axis of the cells is parallel to the width dimension of the housing, said first plurality of cells having a positive terminal at one end and a negative terminal at the opposite end; a second plurality of cylindrical cells connected in series and assembled in said housing such that the longitudinal axis of the cells is parallel to the width dimension of the housing and parallel to and in the plane of the longitudinal axis of the first plurality of cells, said second plurality of cells having a positive terminal at one end and a negative terminal at the opposite end; a first conductive strip electronically connected to the first terminal on said housing at one end and to the positive terminal of said first plurality of cells at the opposite end; a second conductive strip electronically connected to the second terminal on said housing at one end and to the negative terminal of said second plurality of cells at the opposite end; a third conductive strip electronically connected to the negative terminal of said first plurality of cells at one end and to the positive terminal of said second plurality of cells at the opposite end so that all the cells within said housing are connected in series to the external terminals on said housing.

2. The battery of claim 1, wherein the depth dimension of the rectangular housing is slightly larger than the diameter of the cylindrical cells.

3. The battery of claim 2 wherein the depth dimension of the rectangular housing is greater than the diameter of the cells by an amount no greater than the thickness of the base and cover materials.

4. The battery of claim 1 wherein the first conductive strip is "L" shaped in which one leg is secured to the first terminal on the rectangular housing by mechanical means and the second leg has a projected disturbance that electronically contacts the positive terminal of said first plurality of cells by pressure contact; and wherein the second conductive strip is "L" shaped in which one leg is secured to the second terminal in the rectangular housing by mechanical means and the second leg has a projected disturbance that electronically contacts the negative terminal of said second plurality of cells by pressure contact.

5. The battery of claim 4 wherein the third conductive strip is "L" shaped in which one leg has a projected disturbance that electronically contacts the negative terminal of said first plurality of cells and a second leg in which the end segment is tapered outward to contact the positive terminal of the second plurality of cells.

6. The battery of claim 5 wherein two parallel ribs are extended from the base of the rectangular housing and disposed substantially at the center of the length dimension parallel to the width dimension to prevent the first plurality of cells from contacting the second plurality of cells and to accommodate a portion of one leg of the third conductive strip between said ribs so as to prevent said portion from contacting the outer containers of the first and second plurality of cells while allowing the tapered end segment of said leg to contact the positive terminal at the end portion of said second plurality of cells.

7. The battery of claim 1 wherein said first plurality of cells and said second plurality of cells each contain three cylindrical cells connected in series.

8. The battery of claim 7 wherein the cylindrical cells are air depolarized cells and wherein the rectangular housing contains at least one aperture to permit oxygen from the atmosphere to enter the interior of the housing.

9. The battery of claim 8 wherein at least two upstanding walls of the rectangular housing each contain at least one aperture to permit oxygen from the atmosphere to enter the interior of the housing.

10. The battery of claim 4 wherein the mechanical means are rivets.

11. The battery of claim 4 wherein the depth dimension of the rectangular housing is slightly larger than the diameter of the cylindrical cells.

12. The battery of claim 11, wherein the depth dimension of the rectangular housing is greater than the diameter of the cylindrical cells by an amount no greater than the thickness of the base and cover materials.

13. The battery of claim 4 wherein the mechanical means are rivets; the cylindrical cells are air depolarized cells; and the rectangular housing contains at least one aperture to permit oxygen from the atmosphere to enter the interior of the housing.

14. The battery of claim 13 wherein said first plurality of cells and said second plurality of cells each contain three cylindrical cells connected in series.

* * * * *